(12) United States Patent
Grundman

(10) Patent No.: US 9,483,566 B2
(45) Date of Patent: Nov. 1, 2016

(54) SYSTEM AND METHOD FOR DETERMINING THE LEGITIMACY OF A LISTING

(71) Applicant: Google Inc., Mountain View, CA (US)

(72) Inventor: Douglas Richard Grundman, Rosemont, PA (US)

(73) Assignee: Google Inc., Mountain View, CA (US)

( * ) Notice: Subject to any disclaimer, the term of this patent is extended or adjusted under 35 U.S.C. 154(b) by 510 days.

(21) Appl. No.: 13/748,022

(22) Filed: Jan. 23, 2013

(65) Prior Publication Data

US 2015/0154190 A1 Jun. 4, 2015

(51) Int. Cl.
*G06F 17/30* (2006.01)
(52) U.S. Cl.
CPC ..... *G06F 17/3087* (2013.01); *G06F 17/30864* (2013.01)
(58) Field of Classification Search
CPC ........... G06F 17/30864; G06F 17/30867; G06F 17/30722; G06F 17/30011; G06F 17/3061; G06F 17/30707; G06F 17/30684
USPC ........................................... 707/748
See application file for complete search history.

(56) References Cited

U.S. PATENT DOCUMENTS

| | | | | |
|---|---|---|---|---|
| 6,065,007 A * | 5/2000 | Muthukrishnan . | G06F 17/30536 |
| 6,192,360 B1 * | 2/2001 | Dumais ............. | G06F 17/30707 |
| 6,311,181 B1 * | 10/2001 | Lee ................... | G06F 17/30469 |
| 6,502,081 B1 * | 12/2002 | Wiltshire, Jr. .... | G06F 17/30707 |
| | | | 706/12 |
| 7,644,075 B2 * | 1/2010 | Zeng et al. ............ | 707/999.005 |
| 7,962,510 B2 | 6/2011 | Najork et al. | |
| 8,583,562 B1 * | 11/2013 | McDaniel et al. ............ | 705/313 |
| 8,909,558 B1 | 12/2014 | Nicks et al. | |
| 2006/0271280 A1 * | 11/2006 | O'Clair ............... | G06F 17/3087 |
| | | | 701/455 |
| 2006/0288272 A1 * | 12/2006 | Kender ............. | G06F 17/30731 |
| | | | 715/205 |
| 2007/0078939 A1 | 4/2007 | Kallen | |
| 2007/0129997 A1 * | 6/2007 | Davies ........................... | 705/14 |
| 2007/0273558 A1 * | 11/2007 | Smith .................. | G08G 1/0962 |
| | | | 340/995.1 |
| 2008/0086555 A1 | 4/2008 | Feinleib | |
| 2008/0270376 A1 * | 10/2008 | Svore .................. | G06F 17/3089 |
| 2009/0063451 A1 * | 3/2009 | Bennett ............. | G06F 17/30864 |
| 2009/0138445 A1 | 5/2009 | White et al. | |
| 2011/0196855 A1 * | 8/2011 | Wable ............... | G06F 17/30631 |
| | | | 707/711 |
| 2014/0280088 A1 * | 9/2014 | Speer .................. | G06F 17/3069 |
| | | | 707/723 |
| 2015/0033120 A1 * | 1/2015 | Cooke ................. | G06F 17/2217 |
| | | | 715/271 |

OTHER PUBLICATIONS

Zipf's law: Modeling the distribution of terms 2008 Cambridge University Press.*
Pavlov et al. Detecting Content Spam on the Web through Text Diversity Analysis. 2011. Proceedings on the Spring Young Researcher's Colloquium on Database and Information Systems SYRCoDIS. Moscow, Russia. 8 pages.*

(Continued)

*Primary Examiner* — James E Richardson
(74) *Attorney, Agent, or Firm* — Lerner, David, Littenberg, Krumholz & Mentlik, LLP

(57) ABSTRACT

A system and method is provided wherein, in one aspect, the likelihood of a listing being spam or enhanced by spam is determined based on whether the number of times that each term appears in descriptions of the listing tend to be equal or tend to reflect a natural language distribution. The likelihood that the listing is spam or enhanced by spam may be used to determine the position of the listing within search results to be displayed to a user.

20 Claims, 9 Drawing Sheets

(56) References Cited

OTHER PUBLICATIONS

Narisawa et al. Detecting Blog Spams using the Vocabulary Size of All Substrings in Their Copies. 2006. In Proceedings of the 3rd Annual Workshop on Weblogging Ecosystem. 10 Pages.*
Cohen et al. Can Zipf analyses and entropy distinguish between artificial and natural language texts?. 1996. [retrieved on Feb. 3, 2016]. Retrieved from the internet:< URL: http://citeseerx.ist.psu.edu/viewdoc/summary?doi=10.1.1.44.5670>.*
"AdWords" [online], <http://en.wikipedia.org/wiki/AdWords>, Feb. 21, 2013, 7 pages.
"Edit Your Business Listing" [online], <http://support.google.com/places/bin/answer.py?hl=en&answer=142914>, printed on Feb. 27, 2013, 1 page.
"How to Do Keyword Research—The Beginners Guide to SEO-Chapter 5 Keyword Research" [online], <http://www.seomoz.org/beginners-guide-to-seo/keyword-research>, printed on Feb. 27, 2013, 5 pages.
"How to Show Up in Local Search Results on Google" [online], <http://www.dummies.com/how-to/content/how-to-show-up-in-local-search-results-on-goo . . . >, printed on Feb. 27, 2013, 2 pages.
"Monetary Value of a #1 Ranking on Google" [online], <http://www.espiremarketing.org/value-of-ranking-number-one>, Feb. 24, 2012, 3 pages.
"Places for Business" [online], <https://accounts.google.com/ServiceLogin?service=lbc&continue=https://www.google.com>, printed Feb. 27, 2013, 1 page.
"tf-idf" [online], <http://en.wikipedia.org/wiki/Term-frequency>, Feb. 25, 2013, 3 pages.
"Understanding Google Places & Local Search—Developing Knowledge About Local Search" [online], <http://blumenthals.com/blog/2009/02/25/google-maps-vs-locksmiths-spammers-spammers . . . >, article dated Feb. 25, 2009 and later comments, 40 pages.
"Understanding Google Places & Local Search—Developing Knowledge About Local Search" [online], <http://blumenthals.com/blog/2009/04/27/google-maps-data-quality-where-do-we-stand-afte . . . >, article dated Apr. 27, 2009 and later comments, 8 pages.
"Uniform distribution (continuous)", [online], <http://en.wikipedia.org/wiki/Uniform_distribution_(continuous)>, Feb. 26, 2013, 8 pages.
"Zipf's Law", [online], <en.wikipedia.org/wiki/Zipf's_law>, Nov. 29, 2012, 5 pages.
"Foodie Fridays—Brussels smartphone apps," published Sep. 21, 2012.

* cited by examiner

| Title ID | Title |
|---|---|
| 1 | AAA Locksmith - 24 Hour Fast, Quality Emergency Service |
| 2 | AAA Emergency Locksmith - 24 Hour Fast Service |
| 3 | AAA Emergency Locksmith - 24 Hour Quality Service |
| 4 | AAA 24 Hour Emergency Locksmith - Quality Service |
| 5 | AAA Locksmith - Fast Quality 24 Hour Service |
| 6 | AAA Locksmith - Emergency 24 Hour Quality Service |
| 7 | AAA Locksmith - Fast 24 Hour Service |
| 8 | AAA Emergency Locksmith |
| 9 | AAA Emergency Locksmith |
| 10 | AAA Locksmith AAA |
| 11 | Emergency Locksmith |
| 12 | Emergency Locksmith |
| 13 | Locksmith |
| 14 | Locksmith |

FIGURE 2

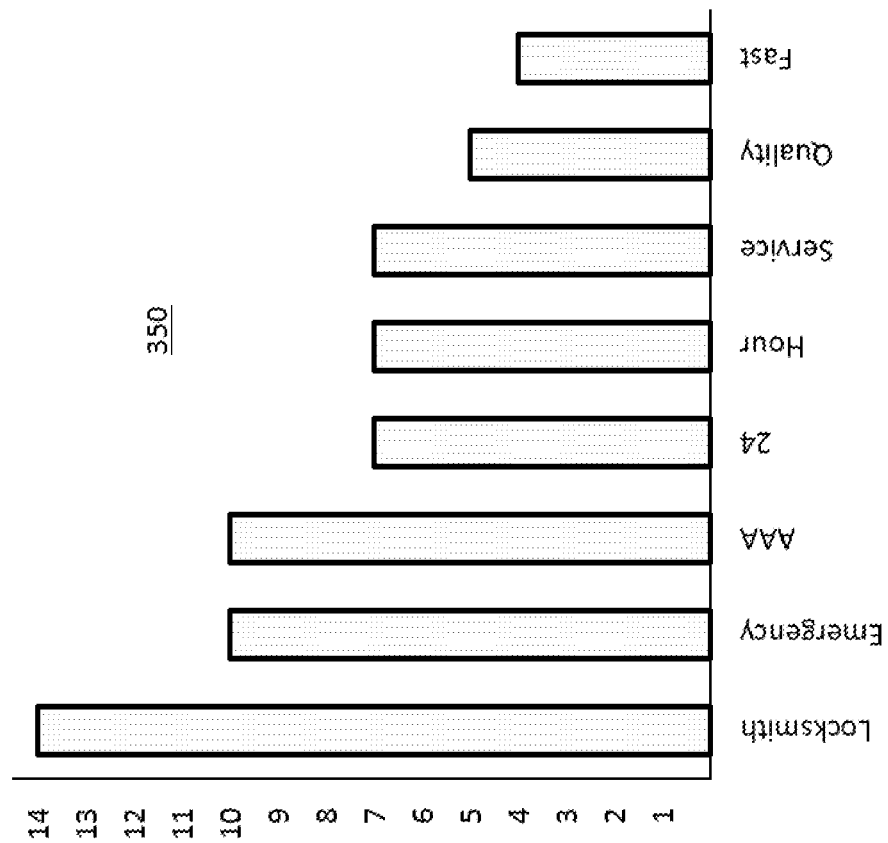
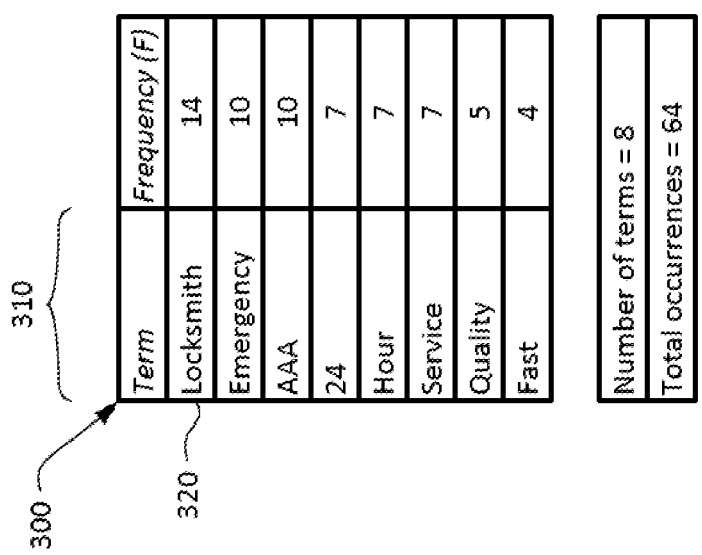
FIGURE 3

SYSTEM AND METHOD FOR DETERMINING THE LEGITIMACY OF A LISTING

BACKGROUND

Existing systems permit users to search listings that are associated with specific geographic locations. For example, a user may search for "pizza" while viewing a map and in response the service may provide search results. The search results may include listings that are proximate to the map and fall within the category of pizza restaurants (or otherwise match the request such as having the term "pizza" in their company name). The service may also return other types of search results, such as advertisements from companies that are paid to have their advertisements shown when a user queries one or more terms regardless of the map being viewed.

The results of the search may be ranked based on the likelihood that a particular result will be of interest to the user that submitted the query. Other factors may be used as well, such as the reliability and safety of the search result, and whether the result is associated with a geographic location of interest to the user.

The business listing search results, or data identifying a business, its contact information, web site address, and other associated content, may be displayed on a map such that a user may easily identify which businesses are located within a particular area.

Some of the listings may be spam, e.g., the user that submitted the listing may not have a legitimate business at the location but is instead using a fake listing to present their actual business phone number to more potential customers. Such users often have a sophisticated understanding of how results are ranked by search engines. Such users may monitor how high their listing is ranked in search results and make major or minor modifications to increase their ranking. For example, such a user may submit many listings for the same business and continuously change the listings so the user can determine, through analysis or trial and error, the most effective way of increasing its ranking in a search engine.

A single listing may be associated with multiple titles. For example, a user may have entered a title for the business associated with the listing and added a second title when the name of the business changed. In addition to user input, titles from sources other than the users voluntarily submitting information about a business may also be used. For example, the titles for a business listing may also be obtained or generated from phone books, websites, public records and other sources. In that regard, users may submit spam titles, e.g., titles that are submitted for the primary purpose of increasing the likelihood that one or more titles will match the query and increase the ranking of the listing in search results.

BRIEF SUMMARY

In one aspect, a method is provided that accesses a set of terms associated with a description of a listing. A processor may then determine and compare different values related to the terms. For example, first values may associate each term with the number of times the term appears in the description. Second values may associate each term with an estimate of the term's frequency, relative to the other terms, in natural language. Third values may represent a substantially uniform value. The processor may determine a score value for the listing based on the similarity of the first values to the second values and the similarity of the first values to the third values. In response to receiving a search request from a user, the user may be provided with search results such that the presence or position of a listing relative to other search results is based on the score value of the listing.

In another aspect, a system is provided that includes a processor and a memory containing instructions accessible by the processor. The memory may also contain data accessible by the processor wherein the data may include two or more descriptions related to the same location-based entity. Each description may include terms. The instructions may include determining a set of measured values, wherein each measured value in the set is associated with a term of a description, and wherein a measured value relates to the number of times the associated term is in the descriptions. Another instruction relates to determining a set of first comparison values, wherein (1) each first comparison value in the set is associated with a term of a description, (2) the first comparison values are based on a function, (3) the term with the greatest measured value is associated with the greatest first comparison value, (4) the term with the least measured value is associated with the least first comparison value, and (5) the greatest first comparison value is greater than the least comparison value. Yet another instruction relates to determining a set of second comparison values, wherein each second comparison value in the set is (1) associated with a term of a description, (2) associated with each term, and (3) substantially equal for each term. Another instruction compares the measured values with the first comparison values and second comparison values in order to determine whether the measured values are more similar to the first or second comparison values. A third value may then be determined based on the comparison, wherein the third value is related to an estimate of the likelihood that the descriptions include spam descriptions.

Still another aspect of the invention relates to a system that includes a processor and a memory containing instructions accessible by the processor. The instructions may include transmitting a search request containing search terms over a network to a computer, the search request being associated with a geographic location. The instructions may further include receiving search results from the computer based on the search terms wherein (1) the search results are associated with the search terms and (2) the search results include a first listing associated with a description and a geographic location. Moreover, the position of the first listing relative to the other search results may be based on: (1) whether a term in the description is associated with the search term, (2) a term frequency value based on the number of times that a term in the description appears in the description relative to other terms and (3) whether the term frequency values are collectively more similar to a constant function than a function defining decreasing values. Yet another instruction may include displaying the search results on an electronic display.

BRIEF DESCRIPTION OF THE DRAWINGS

FIG. 2 is a diagram of sample data.
FIG. 3 is a diagram of sample measured frequency values for terms.

DETAILED DESCRIPTION

Figure 1:
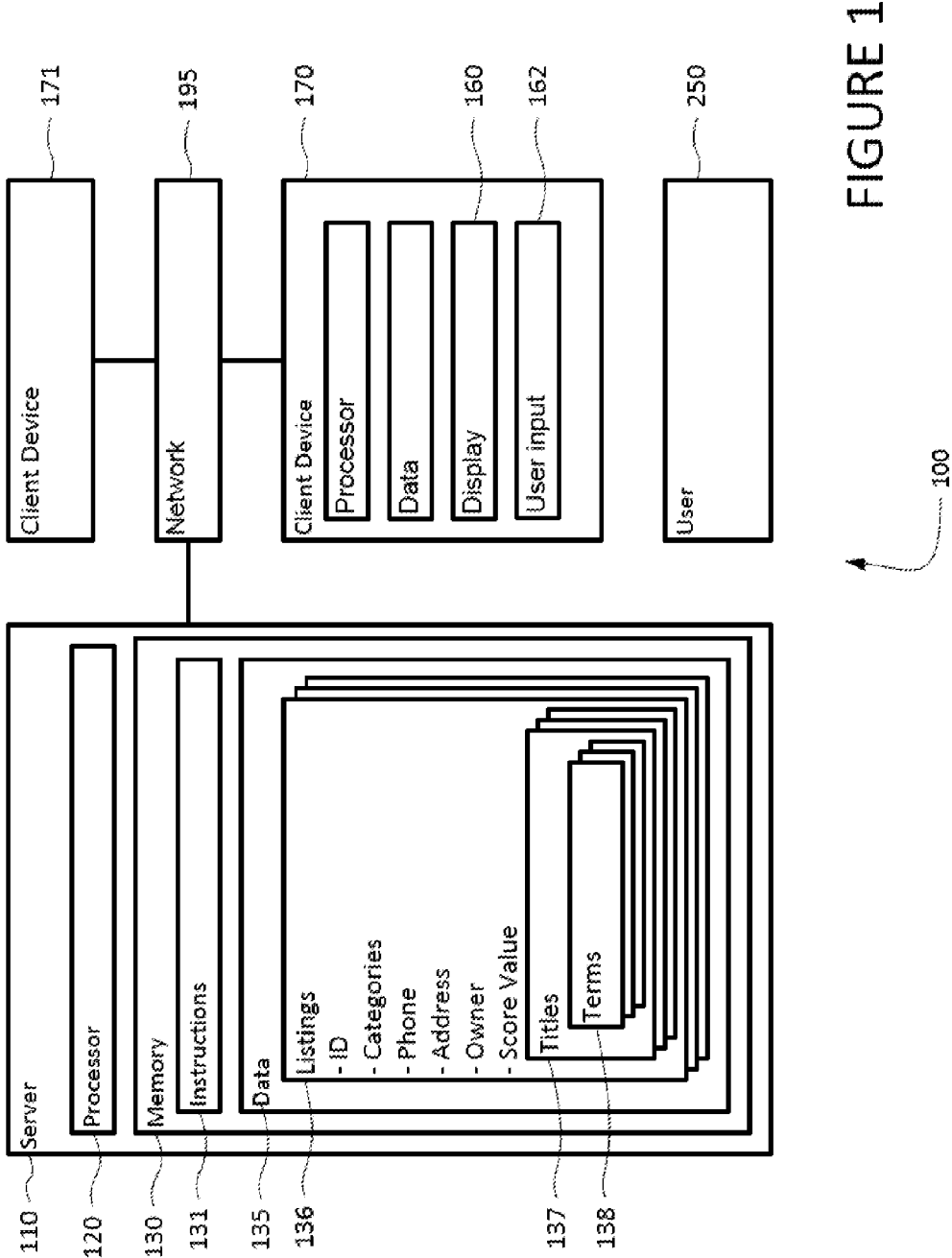
FIG. 1 is a functional diagram of a system.

In one aspect, a system and method is provided that determines the likelihood that a geographically-associated listing is spam by analyzing the titles associated with the listing and determining whether the titles' terms are distributed uniformly or distributed in a manner that reflects the pattern of natural speech. If the distribution tends to reflect natural speech distribution patterns more than uniformity, the listing may be more likely to be spam.

System 100 may comprise a device or collection of devices, such as but not limited to a server 110 containing a processor 120, memory 130 and other components typically present in general purpose computers.

Memory 130 stores information accessible by processor 120, including instructions 131 and data 135 that may be executed or otherwise used by the processor 120. The memory 130 may be of any type capable of storing information accessible by the processor, including a computer-readable medium or other medium that stores data that may be read with the aid of an electronic device, such as ROM, RAM, a magnetic or solid-state based hard-drive, a memory card, a DVD or other optical disks, as well as other volatile and non-volatile write-capable and read-only memories. Systems and methods may include different combinations of the foregoing, whereby different portions of the instructions and data are stored in different locations on different types of media.

The instructions 131 may be any set of instructions to be executed directly (such as object code) or indirectly (such as scripts or collections of independent source code modules interpreted on demand) by the processor. For example, the instructions may be stored as computer code on a computer-readable medium. In that regard, the terms "instructions," "programs" and "applications" may be used interchangeably herein. Functions, methods and routines of the instructions are explained in more detail below.

The data 135 may be retrieved, stored or modified by processor 120 in accordance with the instructions 131. For instance, although the system and method is not limited by any particular data structure, the data may be stored in computer registers, in a relational database as a table having a plurality of different fields and records, XML documents or flat files. The data may also be formatted in any computer-readable format. By further way of example only, image data may be stored as bitmaps comprised of grids of pixels that are stored in accordance with formats that are compressed or uncompressed, lossless (e.g., BMP) or lossy (e.g., JPEG), and bitmap or vector-based (e.g., SVG), as well as computer instructions for drawing graphics. The data may comprise any information sufficient to identify the relevant information, such as numbers, descriptive text, proprietary codes, references to data stored in other areas of the same memory or different memories (including other network locations) or information that is used by a function to calculate the relevant data.

The processor 120 may be any conventional processor, such as processors from Intel Corporation or Advanced Micro Devices. Alternatively, the processor may be a dedicated device such as an ASIC. Although FIG. 1 functionally illustrates the processor, memory, and other elements as being within the same block, those of ordinary skill in the art will understand that the processor and memory may actually comprise multiple processors and memories that may or may not be stored within the same physical housing. For example, rather than being stored in the same computer, processor 120 and memory 130 may be stored in separate servers or have various portions distributed among many servers.

The server 110 may be at one node of a network 195 and capable of directly and indirectly communicating with other nodes of the network such as client devices 170-171. Network 195 and the server's communication with other devices, including computers, connected to the network may comprise and use various configurations and protocols including cellular networks (e.g., 4G LTE), other wireless networks (e.g., WiFi), the Internet, intranets, virtual private networks, local Ethernet networks, private networks using communication protocols proprietary to one or more companies, instant messaging, HTTP and SMTP, and various combinations of the foregoing. Although only a few devices are depicted in FIG. 1, a typical system can include a large number of connected devices.

While not limited to any particular type of product, devices 171 may be a cell phone, tablet or portable personal computer intended for use by a person and includes components normally used in connection with such devices such as an electronic display 160 (e.g., a small LCD touch-screen, a monitor having a screen, a projector, a television, or any other electrical device that is operable to display information), user input 162 (e.g., a mouse, keyboard, touch screen or microphone), camera, speakers, a network interface device and all of the components used for connecting these elements to one another. Indeed, devices in accordance with the systems and methods described herein may comprise any device capable of processing instructions and transmitting data to and from humans including general purpose computers. Server 110 may thus display information on display 160 of client device 170 via network 195.

The system and method may access listing information identifying local businesses or other objects or features associated with particular geographic locations. For example, data 135 accessible by processor 120 of server 110 may include a database of listings 136. Each listing 136 may store information such as one or more titles 137 (e.g., the name of the business such as "Tom's Locksmith Shop"), and each title may in turn include one or more terms 138 such as words, phrases or characters (e.g., "Tom's", "Locksmith", "Shop"). Each listing may also identify one or more categories (e.g., "locksmith" or "hotel"), contact information for customers (e.g., a telephone number), other information (e.g., a website address) and a geographic location.

The geographic location 220 may be stored in a variety of formats with varying levels of precision. By way of example, the geographic location may be stored as a street address. However, the location data may also specify a large region (e.g., a city or state) or a very specific point (e.g., a precise latitude/longitude position). The server may include the components necessary to convert geographic location data from one format to another, such as converting a street address into a latitude/longitude position by the use of a geocoder or the like.

The listings and titles in the listing database 136 may be obtained in a variety of ways. For example, a listing for a business may be obtained by automatically gathering business information from websites or telephone directories. When the system and method identifies a new listing from a source, it may determine whether another listing already exists for the relevant business. By way of example, if a user submitted a listing for a business named "Tom's Locksmith Shop" located at "123 Main Street, Springfield, N.J.", and an entry for "Tom's Locksmith Inc." at the same address was found in a telephone directory, the listing database may associate both titles ("Tom's Locksmith Shop" and "Tom's Locksmith Inc.") with the same listing.

As noted above, listings and titles may be obtained from users that provided the listing to the system and method. By way of example, a user at client device 170 may log into a web page served by server 110, create a new listing and manually enter the relevant information into the web page. The new listing would then be stored in the listing database 136. The listing may also associate a user 250 with the listing, e.g., the user that submitted, owns or controls the listing. The user may be a single person, a collection of people, a legal entity such as a corporation, or any other entity capable of providing a listing to the server. For instance, the user 250 may be a computer—particularly if the computer emulates the behavior of a user for the purpose of preventing server 110 from detecting that the submitter is not human.

In certain aspects, a user may also cause multiple titles to be associated with the same listing. By way of example, if the user is aware of the sources that the system and method uses to find listings, the user may—in addition or alternatively to submitting information directly to the listing database 136—submit listing information to the other sources as well. Other systems and methods may also permit users to store multiple titles for the same listing directly in listing database 136. For instance, the system may permit users to enter multiple listings in order to accommodate name changes (e.g., associating a business's old name and new name with the listing) or other name associations (e.g., the business's customers know the business by multiple names).

In many cases, there will be a single listing in the listing database 136 for each different business. However, the same business may be associated with many different listings, and a single listing may be associated with many different businesses. In that regard, the system and method may also be used in connection with various combinations of descriptions associated with listings, such as titles and categories. The system and method may also be used to evaluate a group of titles associated with a single listing, a group of listings having a single field (e.g., each listing may be constrained to a single title and no other descriptive fields), or all of the descriptive information contained within a group of listings (e.g., each listing may include multiple titles and multiple categories).

Listings may also identify other geographically-located objects in addition to or instead of businesses. For example, they may also identify individual's homes, landmarks, roads, bodies of land or water, etc. Therefore, while many of the examples below refer to business listings, most aspects of the system and method are not limited to any particular type of listing.

Some users may submit listings, directly or indirectly into listing database 136, that have the appearance of, but actually are not, associated with local businesses that legitimately provide the services described in the listing. For instance, a user ("spammer") may have entered a spam listing, such as a listing that is not associated with a local business (e.g., it may list a fake address in its listing), a listing for a business that is incapable of providing or unwilling to provide the goods associated with the listing (e.g., a product or service) in accordance with the reasonable expectations of customer, a listing of a business that historically uses fraud or other deceitful tactics to charge fees much greater than the market value of the relevant goods, etc.

Yet further, such a user may determine through analysis or trial and error that a few minor changes to the titles of a listing will increase its ranking. Spammers may also enter many titles to a listing that are only slight variants of one another, check how often each listing is selected by a user, and use this information to change similar listings and titles to obtain a higher ranking. Spam titles may also come from entities that have a legitimate business. For example, an entity may add titles that are not actually used by any third party to refer to the business but are designed to increase the rank of the listing in search results.

Figure 8:
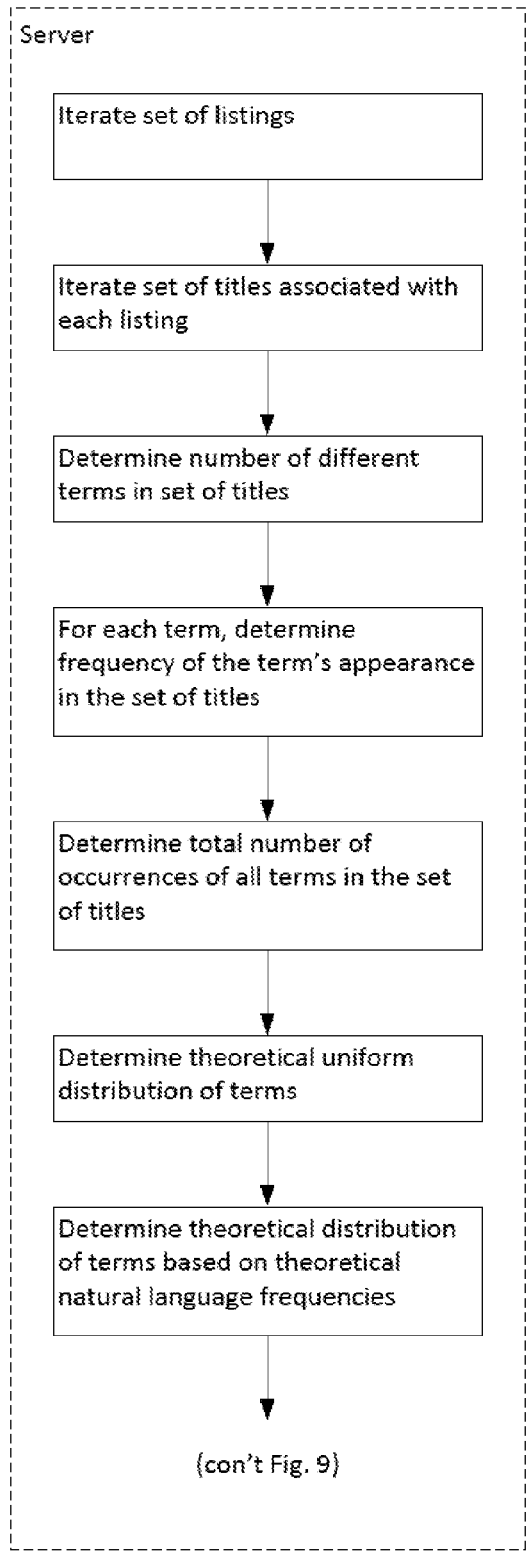
FIG. 8 is a flowchart.
Figure 9:
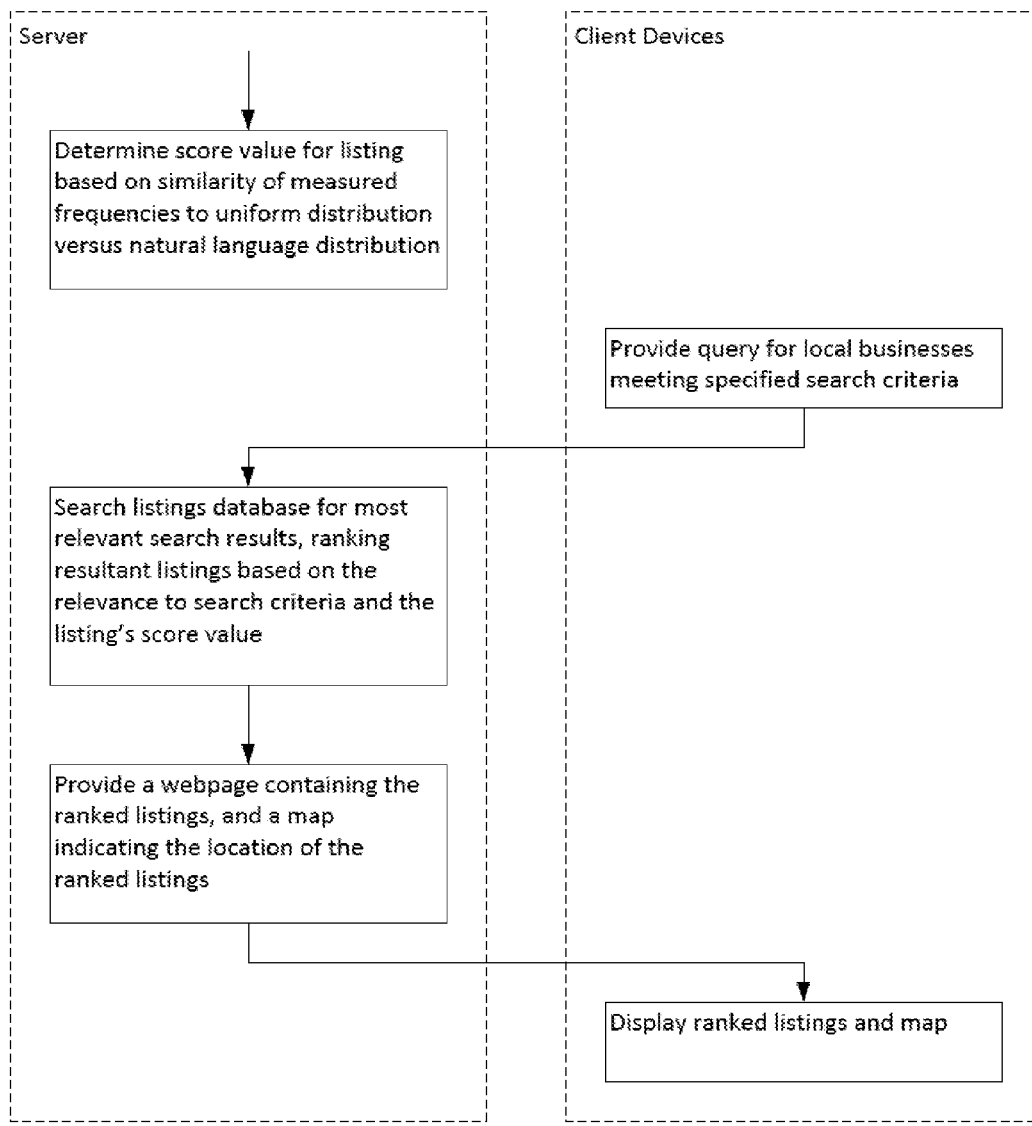
FIG. 9 is a flowchart.

In addition to the operations illustrated in FIGS. 8-9, operations in accordance with the system and method will now be described. Various operations can be handled in a different order or simultaneously, and each operation may be composed of other operations.

The system and method may determine the number of different terms appearing in titles of a listing in order to determine the likelihood, and extent to which, the listing includes spam titles. By way of example, the processor may iterate through the titles 137 of a listing 136 and store a record of each unique term 138 that it finds. In that regard, the processor may analyze the titles shown in FIG. 2 and compile term table 300 shown in FIG. 3, which contains eight different terms 310: Locksmith, Emergency, AAA, 24, Hour, Service, Quality and Fast. For ease of reference, reference to "termcount" below will be understood to refer to the total number of unique terms, e.g., termcount=8.

The frequency with which each term appears in the titles may also be determined. For instance, the processor may determine how often a particular term appears in the various titles. The processor may or may not ignore duplicate occurrences within the same title; if duplicate occurrences within the same title are ignored, then the frequency of a term will be equal to the number of titles that contain the term. As shown in table 300 and graph 350, the processor may thus determine that the frequency of the term Locksmith 320 is 14, i.e., it appears in the titles of 14 different listings. For ease of reference, the function F(t) represents the measured frequency of each term t, e.g., F("Locksmith")=14 and F("Emergency")=10, and references to function "F" without reference to a particular term refers to the entire set of frequency values.

The system and method may further determine the total number of occurrences of all terms in the set of titles. For example, the total occurrences associated with listings 210 and 220 would be 5 because 3 unique terms occur in the title "AAA Emergency Locksmith" and 2 unique terms occur in the title "AAA Locksmith AAA". If frequency is determined as indicated above, one method of calculating the total occurrences involves totaling the frequency values of the individual terms. For ease of reference, the term "occurrences" when used in equations will be understood to refer to the total number of occurrences, e.g., occurrences=64.

Figure 4:
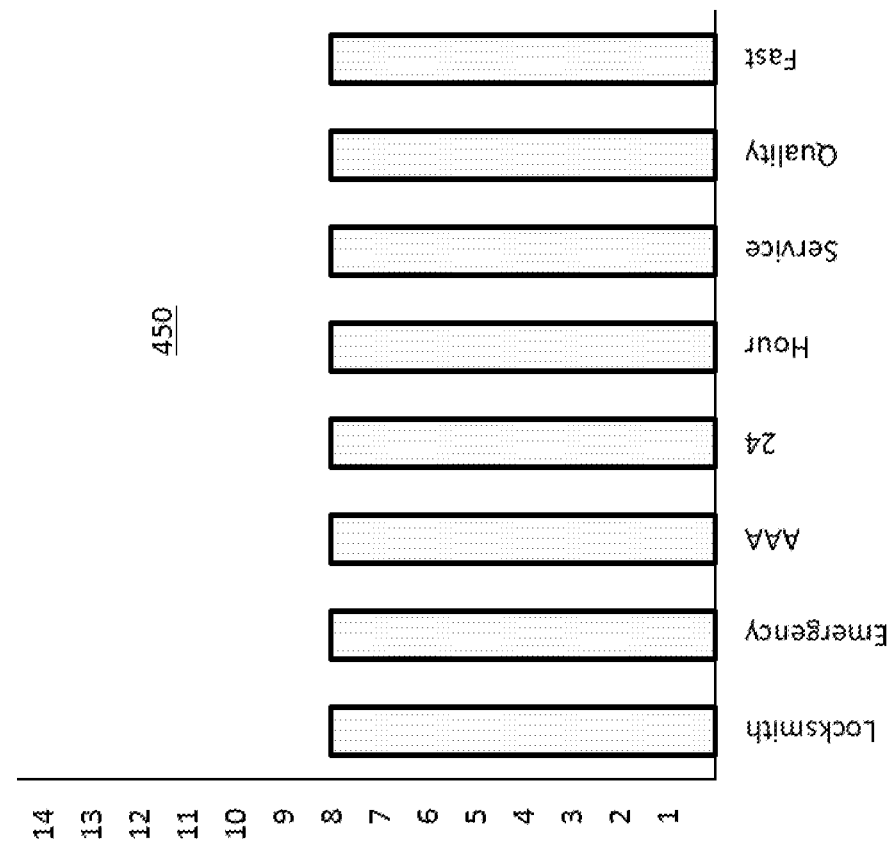
FIG. 4 is a diagram of sample uniform values for terms.

The measured frequency values may be compared to other potential frequency values, such as what the frequency values would have been if all of the words were uniformly distributed within the titles. Table 400 and graph 450 of FIG. 4 illustrate the frequency values of the terms shown in chart 300 if all of the terms appeared with the same frequency in the graph. For ease of reference, the function U(t) represents the uniform frequency of each term t, e.g., U("Locksmith")=8 and U("Emergency")=8, and references to function "U" without reference to a particular term refers to the entire set of frequency values. In that regard, the uniform frequency value of a term may be determined by U(t)=occurrences/termcount.

Although the foregoing and following examples assume that the uniform frequency value is equal to the same constant, other aspects of the invention may use distributions that are substantially but not completely uniform (it being understood that substantially uniform distributions include completely uniform distributions). By way of example only, if empirical evidence indicates that the frequency of terms in spam-less titles tends to decrease linearly and slowly from term to term, the function U(t) may represent a line having a slightly downward slope.

The measured and uniform frequency values may be compared to still more potential frequency values, such as what the frequency values would have been if the terms were distributed among the titles with approximately the same frequency the terms may appear in natural language. By way of example, the processor may determine the frequency of the terms in natural language by querying a database associating individual terms with the frequency in which the terms appear in a large text corpus. In one aspect, the natural language frequency terms may be estimated in accordance with Zipf's law, which relates to the observation that in natural language texts the frequency of a word tends to be inversely proportional to its rank relative to the frequency of other words, e.g., that the kth most frequent word will occur roughly 1/k as often as the most frequent word.

Figure 5:
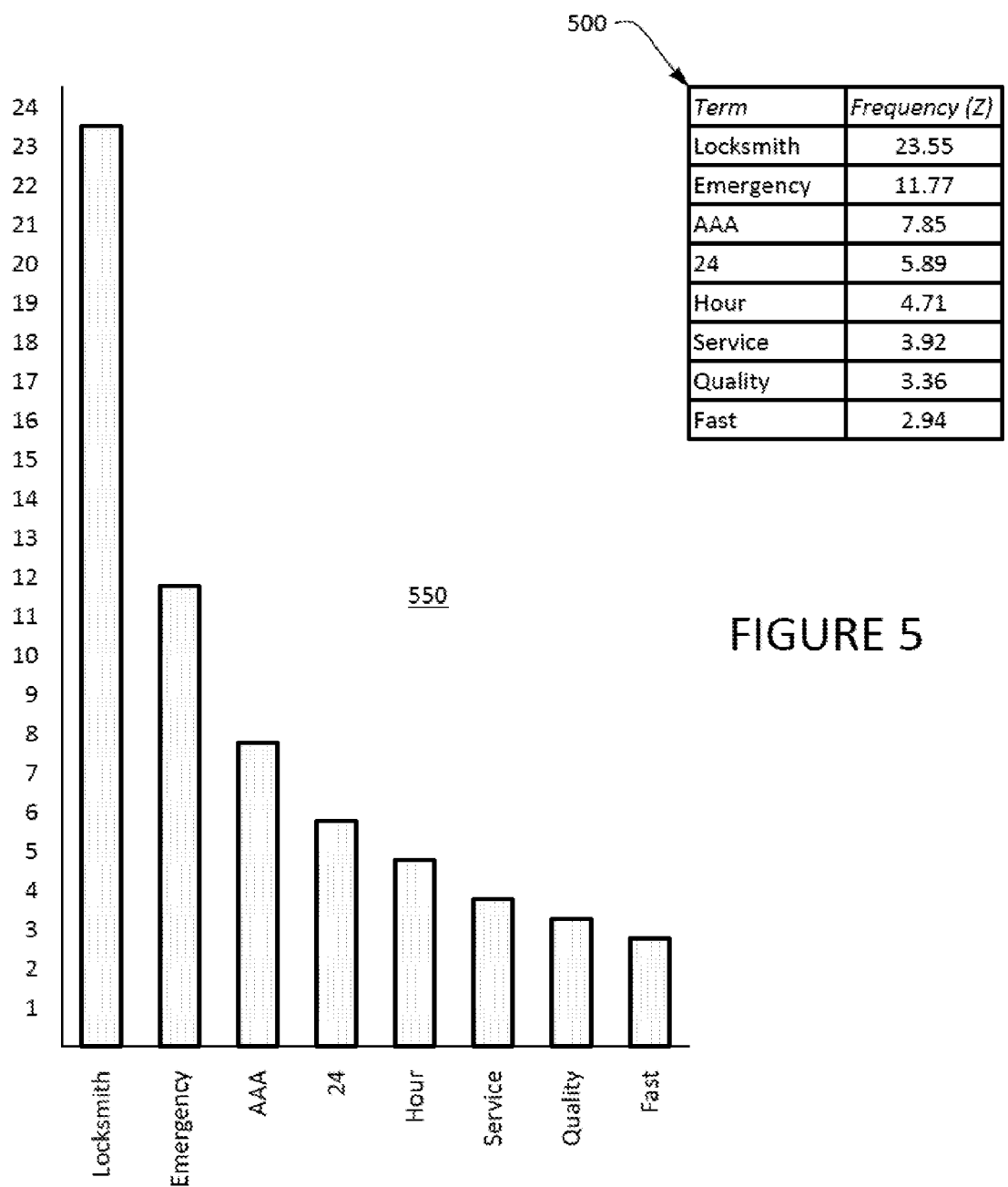
FIG. 5 is a diagram of sample natural language based frequency values for terms.

Table 500 and graph 550 of FIG. 5 illustrate the frequency values of the terms shown in chart 300 if the frequency of the terms matched Zipf's law, e.g., if the frequency of "Emergency" (the second most frequent term) was one-half (½) of the frequency of "Locksmith" (the most frequent term). For ease of reference, the function Z(t) represents a Zipf-based frequency of each term t, e.g., Z("Locksmith")=23.55 and Z("Emergency")=11.77, and references to function "Z" without reference to a particular term refers to the entire set of Zipf-based frequency values. In that regard, the Zipf-based value of a term may be determined by Z(t)=1/n*1/h*occurrences, where h=the sum of series 1/k for k ranging from 1 to termcount, and where n=the ranked order of term t (e.g., n=1 if the term is the most frequent, n=2 if the term is the second most frequent, etc.). In some aspects of the system and method, other functions defining decreasing values may be used as Z(t), such as but not limited to Z(t)=[f(n)]/n or Z(t)=f1(f2(n),1/n), i.e., where Z(t) is based on 1/n but Z(t) is based on other factors as well.

Figure 6:
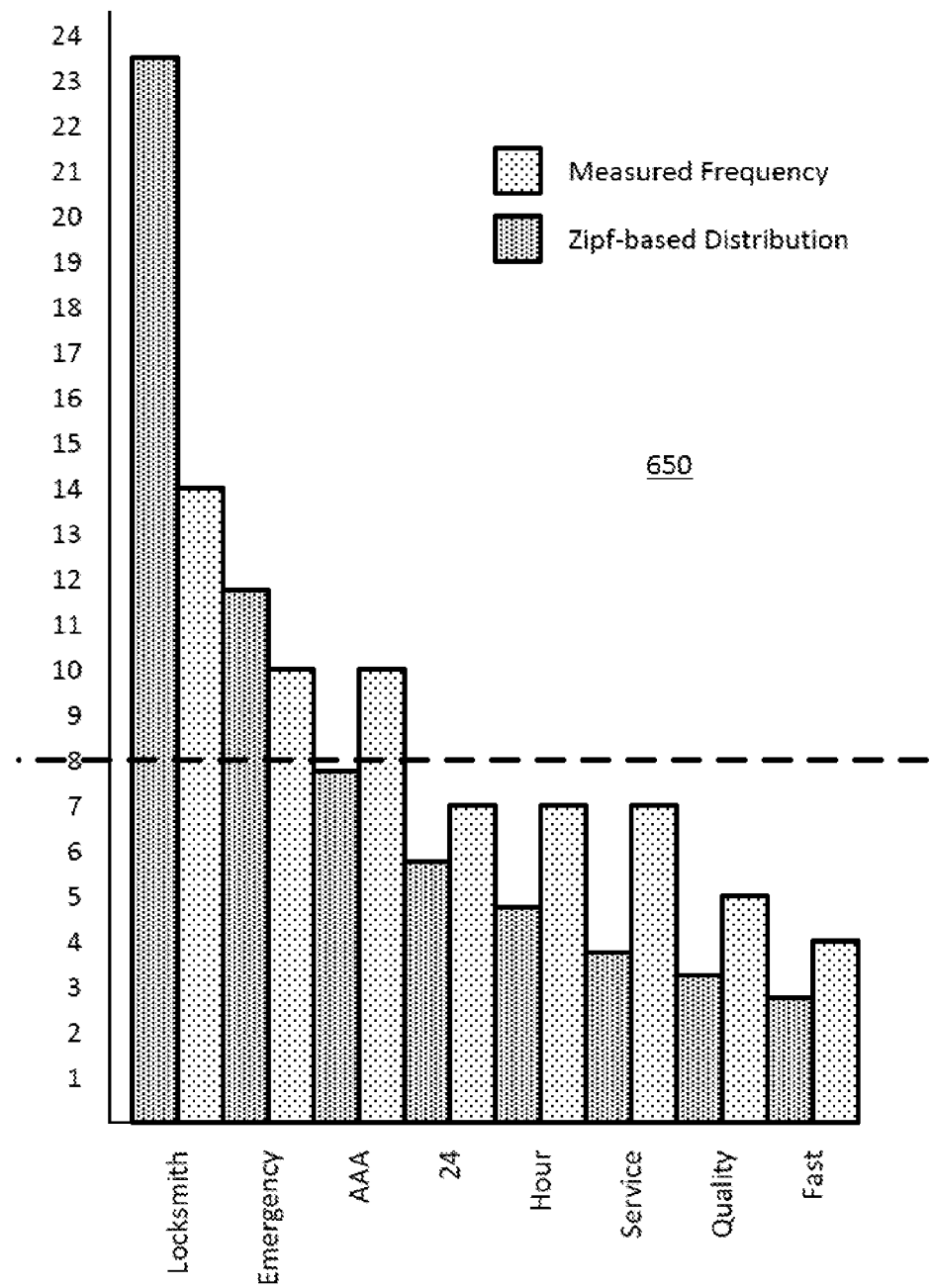
FIG. 6 is a diagram comparing the sample measured, natural language based and uniform frequency values for terms.

Graph 650 of FIG. 6 compares the three different sets of frequency value examples. The measured distribution is represented by the lighter bars whereas the Zipf-based distribution is represented by the darker bars. As can be seen and consistent with a Zipf-based distribution, the sample measured values are such that the frequency value of the least frequent term ("Fast") is quite small compared to the frequency value of the most frequent term ("Locksmith"). However, the measured frequency values also share some traits with the uniform distribution values, which are represented by the dashed line. The frequency values for "24", "Hour" and "Service" are the same. In that regard, the measured distribution has traits that are consistent with both the Zipf-based and uniform distributions.

The system and method may determine whether the frequency values of the terms in the listings are collectively more similar to a uniform distribution or a natural language distribution such as a Zipf-based distribution.

Spammers often submit many listings or titles for the same business in the hope that a greater number of listings increases the odds that the listing will be ranked highly in search results shown to a user. Unlike listings submitted by spammers, multiple listings obtained from multiple sources for the same business will have tend to use the same title to describe the business, e.g., different phone books may individually describe a business at a particular address as "AAA Locksmith", "AAA Locksmiths", "AAA Locksmith Inc." or "AAA Locksmith Incorporated". Indeed, all of the titles from different sources may be identical.

This can be contrasted with spammers, who may submit titles with greater differences and more descriptive, marketing oriented terms. Marketing text may be expected to follow natural language distributions such as a Zipf-based distribution. Accordingly, if a collection of titles tends to have characteristics that are more similar to marketing text than data pulled from generally objective sources, there is an increased likelihood that at least some of the titles are spam. In another aspect, the distribution of terms among titles that are known to be spam may be used for comparison with uniform text.

The system and method may assign a score value to a set of titles based on whether the measured distribution of terms is more similar to a uniform distribution (as may tend to occur when a listing is obtained from a legitimate source) or natural language distribution such as Zipf-based distribution (as may tend to occur when a listing is obtained from spammers). One possible method of making this determination comprises the following algorithm, which uses the foregoing example values for the purposes of illustration.

The sets of values may be represented as vectors in an N-dimensional space where N=termcount. The functions may be represented as vectors as follows:

U=(8, 8, 8, 8, 8, 8, 8, 8)
F=(14, 10, 10, 7, 7, 7, 5, 4)
Z=(23.55, 11.77, 7.85, 5.89, 4.71, 3.92, 3.36, 2.94)

The processor may then locate the point V on the line passing through U and Z that is the orthogonal projection of F onto that line. For example, V may be determined as follows, where d(x,y) represents the distance between the two points x and y (e.g., the square root of the sum of squared differences of corresponding coordinates):

$$c=((F-U)\bullet(Z-U))/d(Z,U)^2$$

$$V=U+c(Z-U)$$

(V is equal to U when F is the same as U, and V is equal to Z when F is the same as Z.) Using the foregoing example values, V would be (14.69, 9.62, 7.94, 7.09, 6.58, 6.25, 6.00, 5.82). V is a point on the line connecting the points U and Z. It is either between U and Z, on the U-side of the line on the other side of U from Z, or on the Z-side of the line on the other side of Z from U. A scoring value may be assigned as follows:

$$\text{score} = \begin{cases} d(V,U)/d(Z,U) \text{ where } V \text{ is between } U \text{ and } V, \\ 1.0 \text{ where } V \text{ is beyond } Z, \text{ and} \\ 0.0 \text{ where } V \text{ is beyond } U. \end{cases}$$

The score value will vary between 0 and 1 depending on whether the measured distribution of terms is more similar to the uniform distribution (in which case the score approaches or equals 0) or more similar to the natural distribution (in which case the score approaches or is equal to 1).

The system and method may use the score value to determine the likelihood that the titles associated with a listing are spam. For example, server 110 may iterate through listings 136, determine a score value based on all of the titles associated with the listing, and then determine that the listing contains a number of likely spam titles if the score value exceeds a threshold.

The aforementioned threshold may be determined in a variety of ways. In one aspect, the threshold may be set to an arbitrary value, which may or may not be changed by a human. The threshold may also be dynamically determined, e.g., it may be set to always identify a specific percentage of terms or listings as highly correlated with spam.

Yet further, the threshold may be determined based on a combination of factors. For instance, trained professionals may manually review the titles of the randomly selected set of listings, and identify the listings that are likely to be spam (e.g., by reviewing the information contained in the listings, by investigating the business at the listing, by considering the titles, etc.) and give a listing a value of "yes" if the listing is likely to be spam and "no" if the listing is unlikely to be spam. Server 100 may iterate through the same listings and, for each listing based on the titles associated with the listing, determine a score value between 0 and 1 as described above. The listings may then be sorted into virtual buckets based on their score value, e.g., all listings with a score value between 0.0 and 0.1 may be placed in a first bucket, all listings with a score value between 0.1 and 0.2 may be placed in a separate bucket, etc. The threshold may be determined based on the percentage of listings within a bucket identified by a reviewer as "yes" versus "no." By way of example, a best match sigmoid function may be used to identify the bucket with the lowest threshold value that captures a desired percentage of spam listings, and that bucket's range of score values may be used to select the threshold.

Upon identifying a listing as likely to be spam, the system and method may take a number of actions. For example, if the score value indicates that the listing is highly likely to be spam, the server 110 may prevent the listing from being displayed in any search results. The server might also flag the listing for manual review and investigation, and take no further action with respect to the listing until a human investigates the listing and determines that the listing should be excluded from or included in search results.

Figure 7:
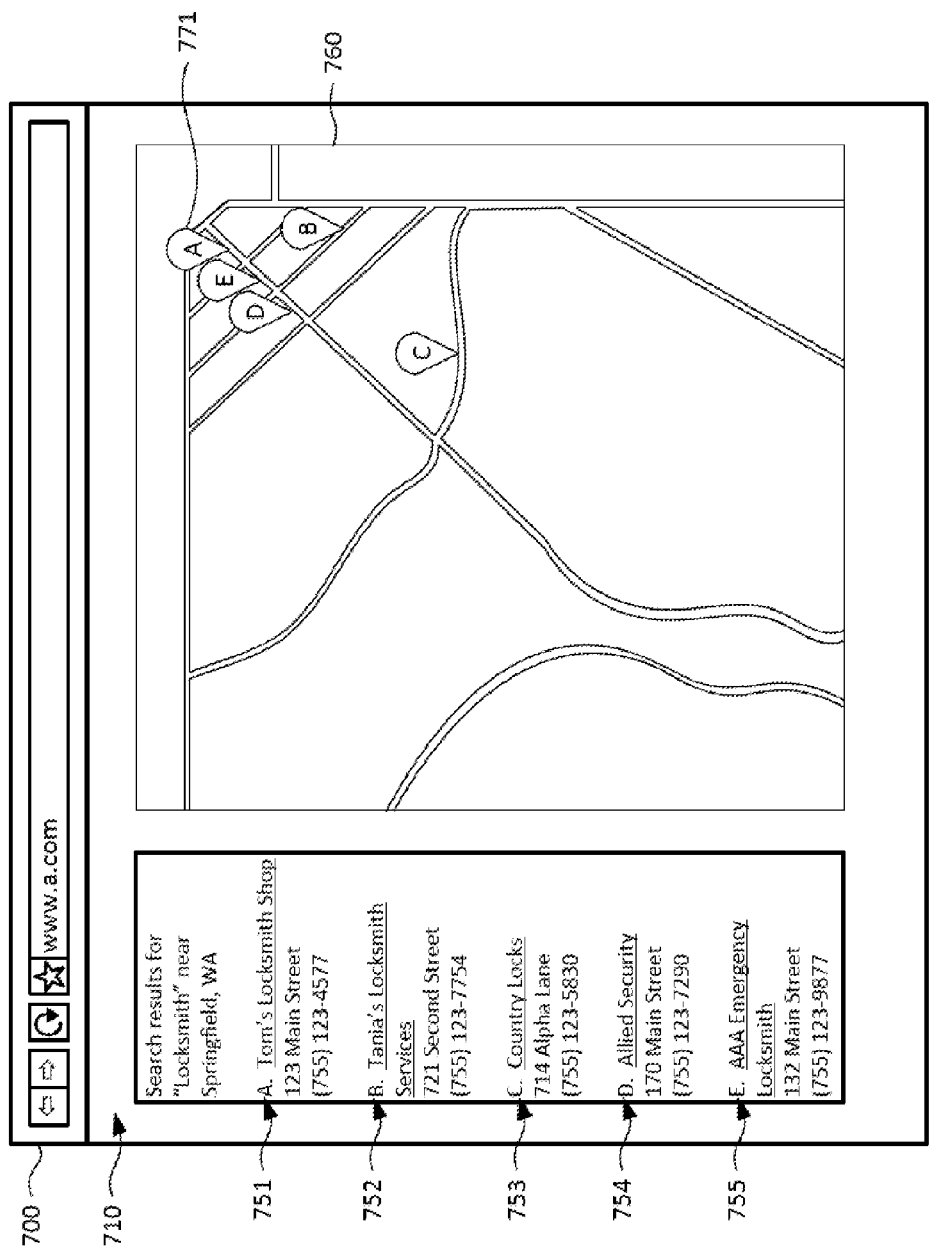
FIG. 7 is a screen shot.

Alternatively and as shown in FIG. 7, the system and method may still include the listing in search results, but with a lower ranking. Webpage 710 of browser 700 illustrates the results of a user searching for "Locksmiths in Springfield, Wash.". Based on various criteria, such as how well the listing's description matches the search request and the popularity of a website associated with a listing, server 110 will return a list of search results. The geographic locations of the listings, such as icon 771 corresponding with the first listing, may also be displayed on a map 760. By clicking an icon or search result, the browser may load and display more information about the selected listing. But for the score value, the listing for "Springfield Locksmiths and Alarms" may have been ranked highly, e.g., shown in one of the most prominent positions on the web page such as at position 751, the first search result.

The high ranking may have occurred at least in part based on the spammer's sophisticated and continuous manipulation of one or more titles for the sole purpose of getting a high ranking. However, because the listing was determined to have a meaningful likelihood of being spam (but not so high as to preclude it from being blocked completely), the listing is instead shown last at position 755. The legitimate listing of "Tom's Locksmith Shop" is shown first, in position 751, and there are four other search results between it and the spam listing. In that regard, the listing's score value may be one factor among many that is used to determine the listing's ranking value. Indeed, the spam listing may be ranked so low that it does not appear among the first set of search results sent to the user but, rather, is sent with a subsequent set of search results when the user indicates that he or she would like to see another page of listings. The listing may also be sent among search results that are not listings, e.g., the search results may also include links to a website, images of products, etc.

The amount the spam listing's rank is lowered may be related to the likelihood that the listing is spam. For instance, the score used to rank a search result may be decreased less for a listing with a low spam likelihood ranking than a listing with a high spam likelihood value.

The system and method may also identify spammers in addition to spam listings. In that regard, if a user is determined to be operating a spam listing, or a given quantity or percentage of the user's listings are determined to be spam, then the user's other listings may also be treated as if they are spam listings. For example, the other listings may be excluded from future search results. Yet further, the spam likelihood value of one listing may depend in whole or in part on the spam likelihood value of the user's other listings. The spammer's other listings may be assigned a spam likelihood value that is based on the spam likelihood value of the listings that were determined to be spam.

As noted above, the system and method is not limited to the foregoing methods. By way of example, rather than determining and comparing sets of discrete values that include measured, natural and uniform related frequency values, the processor may extrapolate a function. For instance, the processor may determine a polynomial that defines a best fitting curve for the measured functions, and then use curve matching techniques to compare that function with functions defining the natural language distribution and uniform distribution. Moreover, the score value does not need to be a single number, but can be or define a set of numbers.

As these and other variations and combinations of the features discussed above can be utilized without departing from the systems and methods as defined by the claims, the foregoing description of exemplary embodiments should be taken by way of illustration rather than by way of limitation of the invention as defined by the claims. It will also be understood that the provision of examples of the invention (as well as clauses phrased as "such as," "e.g.", "including" and the like) should not be interpreted as limiting the invention to the specific examples; rather, the examples are intended to illustrate only some of many possible aspects. The sample values, types and configurations of data described and shown in the figures are for the purposes of illustration only. Unless expressly stated to the contrary, every feature in a given embodiment, alternative or example may be used in any other embodiment, alternative or example herein.

The invention claimed is:

1. A method comprising:
    accessing a set of terms associated with a description of a listing,
    determining first values with a processor, where a first value associates each term in the set of terms with the number of times the term appears in the description;
    determining second values with a processor, where a second value associates each term in the set of terms with an estimate of the term's frequency, relative to the frequency of the other terms, in natural language;
    determining a total number of unique terms in the set based on the total number of terms in the set if all duplicates of the same term were reduced to a single term;
    determining a total number of all terms in the set including unique and duplicate terms;
    determining third values with a processor, where the third values are uniform and are based on the total number of unique terms relative to the total number of all terms;
    determining, with a processor, a score value for the listing based on the similarity of the first values to the second values and the similarity of the first values to the third values; and
    in response to receiving a search request from a user, providing the user with search results associated with search terms in the search request, wherein the results include the listing and the presence or position of a listing relative to other search results is based on the score value of the listing.

2. The method of claim 1 wherein the description comprises at least one title of a listing.

3. The method of claim 2 wherein the description comprises a plurality of names of businesses.

4. The method of claim 1 wherein the estimate of the term's frequency within a corpus of natural language text comprises determining a second set of values based on a decreasing function and associating each value of the second set with a term within the set of terms associated with the listing.

5. The method of claim 1 wherein the score value is related to the estimated likelihood that the description includes text entered by a user for the purpose of increasing the ranking of the listing within search results.

6. The method of claim 1 wherein the third values comprise a set of equal values.

7. The method of claim 1 wherein the second values are based on a Zipf-based function.

8. The method of claim 1 wherein the second values are based on a decreasing function.

9. The method of claim 8 wherein the second values are further based on the total number of terms in the description.

10. The method of claim 1 wherein the second value for the term appearing the most in the description is greater than every other second value, and wherein the second value for the term appearing the least in the description is less than every other second value.

11. The method of claim 1 further comprising determining the score value of a first listing, identifying the user that submitted the first listing, identifying other listings submitted by the user, and wherein the position of the other listings within search results provided to another user is based on the score value of the first listing.

12. The method of claim 1 wherein the third values are determined based on a linear function with a downward slope.

13. A system comprising:
    a processor;
    a memory containing instructions accessible by the processor;
    the memory containing data accessible by the processor, said data comprising a plurality of descriptions related to the same location-based entity, each description comprising terms;
    said instructions, when accessed from the memory by the processor, cause the processor to perform functions:
    determining a set of measured values, wherein each measured value in the set is associated with a term of a description, and wherein a measured value relates to the number of times the associated term is in the descriptions;
    determining a set of first comparison values, wherein each first comparison value in the set is associated with a term of a description, wherein the first comparison values are based on a function, wherein the term with the greatest measured value is associated with the greatest first comparison value, wherein the term with the least measured value is associated with the least first comparison value, and wherein the greatest first comparison value is greater than the least comparison value;
    determining a total number of unique terms in the set based on the total number of terms in the set if all duplicates of the same term were reduced to a single term;
    determining a total number of all terms in the set including unique and duplicate terms;
    determining a set of second comparison values, wherein each second comparison value in the set is associated with a term of a description, wherein the second comparison value is equal for each term and based on the total number of unique terms in the description relative to the total number of terms in the description;
    comparing the measured values with the first comparison values and second comparison values so as to determine whether the measured values are more similar to the first or second comparison values;
    determining a third value based on the comparison, and wherein the third value is related to an estimate of the likelihood that the descriptions include spam descriptions; and
    in response to receiving a search request from a user, providing the user with search results including at least one of the description of the plurality of the descriptions, wherein the presence or position of the description relative to other search results is based on the third value.

14. The system of claim 13 wherein the function is based on the function f(t)=1/t, where "t" represents the position of a term within a ranked list of unique terms, where the terms in the list are taken from the terms in the description, and wherein the position of a term in the list is ranked based on the term's measured value.

15. A system comprising:
    a processor, and
    a memory containing instructions accessible by the processor,
    said instructions comprising:
    transmitting a search request containing search terms over a network to a computer, the search request being associated with a geographic location;
    receiving search results from the computer based on the search terms, wherein the search results are associated with the search terms, the search results include a first listing associated with a description and a geographic location, and the position of the first listing relative to the other search results is based on: (a) whether a term in the description is associated with the search term, (b) a term frequency value based on the number of times that a term in the description appears in the description relative to other terms, and (c) whether the term frequency values are collectively more similar to a constant function than a function defining decreasing values, wherein the constant function returns a constant value based on the total number of unique terms in the set relative to the total number of all terms in the set, and wherein the total number of unique terms in the set is based on the total number of terms in the set if all duplicates of the same term were reduced to a single term and the total number of all terms in the set includes unique and duplicate terms; and displaying the search results on an electronic display.

16. The system of claim 15 further comprising determining the constant based on the term frequency values.

17. The system of claim 15 wherein the function defining decreasing values is a Zipf-based function.

18. The system of claim 15 further comprising a display.

19. The system of claim 15 further comprising receiving a map of the geographic location and simultaneously displaying the search results and the map.

20. The system of claim 15 wherein the search results are received in successive sets, each set being received and displayed in response to a user request, and the first listing is excluded from the first displayed set of search results.

* * * * *